United States Patent [19]

Younes

[11] Patent Number: 4,607,081

[45] Date of Patent: Aug. 19, 1986

[54] COMPOSITION COMPRISING A MATRIX RESIN AND AN ALTERNATING COPOLYMER OF BROMINATED STYRENE AND N-BROMINATED PHENYL MALEIMIDE FLAME RETARDING ADDITIVE

[75] Inventor: Usama E. Younes, Newtown Square, Pa.

[73] Assignee: Atlantic Richfield Company, Los Angeles, Calif.

[21] Appl. No.: 668,458

[22] Filed: Nov. 5, 1984

Related U.S. Application Data

[62] Division of Ser. No. 489,688, Apr. 28, 1983, Pat. No. 4,508,883.

[51] Int. Cl.$^4$ .................. C08F 214/16; C08L 39/04
[52] U.S. Cl. .................................. 525/186; 524/548; 525/203
[58] Field of Search ............... 526/262; 525/203, 186; 524/548

[56] References Cited

U.S. PATENT DOCUMENTS

| | | | |
|---|---|---|---|
| 3,705,209 | 12/1972 | Matlack et al. | 525/186 |
| 4,072,644 | 2/1978 | Hedrick | 524/548 |
| 4,266,037 | 5/1981 | DiGiulio et al. | 524/548 |
| 4,302,484 | 11/1981 | Rosenkranz | 526/262 |
| 4,351,932 | 9/1982 | Street et al. | 524/548 |
| 4,388,451 | 6/1983 | Culbertson et al. | 526/262 |
| 4,508,883 | 4/1985 | Younes | 526/262 |

*Primary Examiner*—Harry Wong, Jr.
*Attorney, Agent, or Firm*—Dennis M. Kozak

[57] ABSTRACT

A flame retarding additive comprising an alternating copolymer of a brominated styrene and N-brominated phenylmaleimide, is blended with a matrix resin to produce molding compositions which when molded exhibit improved flame retarding characteristics. The flame retarding additives of this invention also exhibit non-blooming characteristics.

5 Claims, No Drawings

COMPOSITION COMPRISING A MATRIX RESIN AND AN ALTERNATING COPOLYMER OF BROMINATED STYRENE AND N-BROMINATED PHENYL MALEIMIDE FLAME RETARDING ADDITIVE

This is a divisional of application Ser. No. 489,688, filed Apr. 28, 1983, now U.S. Pat. No. 4,508,883.

This invention relates to flame retarding additives for molding compositions.

In one of its more specific aspects this invention relates to the incorporation of a flame retarding additive comprised of an alternating copolymer of brominated styrene and N-brominated phenylmaleimide into a polymeric molding composition for the purpose of improving the flame retarding characteristics of the molded product.

According to this invention there is provided an alternating copolymer having the following general formula:

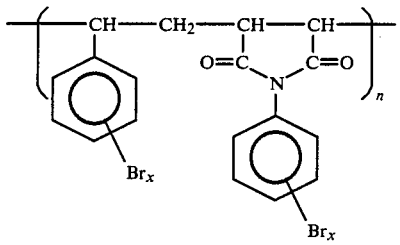

wherein each x separately represents an integer of from 1 to 5 and n represents an integer of from 10 to 2000.

Also, according to this invention there is provided a moldable composition comprising a matrix resin and an alternating copolymer having the above illustrated general formula, the alternating copolymer being present in an amount sufficient to improve the flame retarding characteristics of the molded composition.

According to this invention there is also provided a method of producing a moldable composition which comprises incorporating into a matrix resin an alternating copolymer having the general formula illustrated above, the alternating copolymer being present in an amount sufficient to improve the flame retarding characteristics of the molded composition.

According to this invention there is also provided a non-blooming, flame retarded molded composition comprised of a matrix resin and an alternating copolymer having the above illustrated general formula.

Optionally, the molding compositions of this invention will comprise up to about 10 weight percent antimony trioxide or any other suitable flame retarding synergist, based on the total weight of the molding composition including the synergist The non-blooming flame retarding additives of this invention can be incorporated into any suitable matrix resin. The matrix resin may be thermoplastic as well as thermoset and may contain conventional additives such as, for example, smoke suppressants, colorants, antioxidants, flame retarding synergists and the like.

Examples of matrix resins which can be employed to produce the non-blooming flame retarded molded compositions of this invention include: polystyrene, polystyrene copolymers, rubber-modified styrenic polymers and copolymers, polycarbonates, ABS polymers, SAN polymers, SBR-latex, poly propylene, polybutadienes, methacrylic resins, vinyl chloride resins, polyamide resins, polyphenylene oxide resins, and the like, and their mixtures.

Any suitable brominated styrene can be used to produce the flame retarding additives of this invention.

Suitable brominated styrenes include monobromostyrene, dibromostyrene, tribromostyrene, tetrabromostyrene, and the like, and their mixtures.

Particularly suitable for use and used in the examples of this disclosure was a brominated styrene designated Great Lakes Dibromostyrene, available from Great Lakes Chemical Corporation.

Great Lakes Dibromostyrene is a reactive monomer containing 61% aromatic bromine having the following general formula:

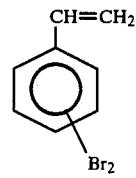

and exhibiting the following typical properties:
Appearance: light yellow liquid
Density: 1.82 g/ml
Boiling Point, %: 95 (at 3 mm Hg)
Assay, %: 99+ brominated styrenes
Isomers: Dibromo 80%, Monobromo 10%, Tribromo 10%

Any suitable N-brominated phenylmaleimide can be used to produce the fire retarding additives of this invention.

Suitable N-brominated phenyl maleimides include N-(monobromophenyl)maleimide, N-(dibromophenyl)maleimide, N-(tribromophenyl)maleimide, N-(tetrabromophenyl)maleimide, N-(pentrabromophenyl)maleimide, and the like and their mixtures.

The N-brominated phenyl maleimides are not known to be available commercially. Accordingly, to demonstrate this invention, a N-(2,4,6-tribromophenyl) maleimide was prepared and used in the examples of this disclosure. Example 1 below demonstrates the method used to prepare the N-(2,4,6-tribromophenyl)maleimide.

Any suitable polymerization process can be employed to produce the alternating copolymers of brominated styrene and N-brominated phenyl maleimide. Examples 2 and 5 below demonstrate methods employed for the preparation of such alternating copolymers.

The flame retarding additives can be incorporated into the matrix resin using any conventional mixing apparatus for incorporating polymeric additives. The amount of flame retarding additive incorporated will be within the range of from about 5 to about 40% by weight of the molding composition, the matrix resin being employed in an amount within the range of from about 60 to about 95% by weight of the composition. Preferably, about 10 to about 30% by weight of the molding composition will be fire retarding additive.

The practice of this invention is further demonstrated by the following examples.

EXAMPLE 1

This example demonstrates the preparation of N-(2,4,6-tribromophenyl)maleimide.

Into a reaction vessel were added and mixed 100 g. (0.303 moles) of 2,4,6-tribromoanaline, 68.34 g (0.697 moles) of maleic anhydride, and 5.16 g (0.379 moles) of zinc chloride.

The resulting mixture was heated at a temperature within the range of from about 139° to 148° C. for about 2 hours.

The resulting reaction product was extracted with xylene, filtered and water washed.

The xylene solvent was removed and the resultant product N-(2,4,6-tribromophenyl)maleimide was recovered at a yield of about 94%.

EXAMPLE 2

This example demonstrates the preparation of a flame retarding additive of this invention.

A one gallon stirred reactor was charged with about 337 g of N-(2,4,6-tribromophenyl)maleimide produced using the procedure of Example 1, 216 g dibromostyrene (Great Lakes Dibromostyrene) 129 g methyl ethyl ketone and 0.2 g benzoyl peroxide. The reactor was purged with nitrogen after which it was heated to 80° C. and the polymerization was allowed to proceed for 23 hours. The polymer solution was diluted by adding about 1000 ml of tetrahydrafuran. The resulting copolymer was precipitated in pentane, filtered, washed several times with acetone to remove unreacted monomers, and dried under vacuum. The resulting alternating copolymer was found to have a weight average molecular weight of 150,000 as measured by GPC using polystyrene standards. It exhibited a glass transition temperature of 244° C.

EXAMPLE 3

This example demonstrates the preparation of a molded composition of this invention.

About 70 g of the flame retarding alternating copolymer produced in Example 2 were dry blended with 378 g of DYLARK ® 250 rubber modified styrene/maleic anhydride copolymer, commercially available from ARCO Chemical Company, division of Atlantic Richfield Company, 18.7 g antimony trioxide and 0.9 g Irganox ® 1010 antioxidant commercially available from Ciba-Geigy Additives Department, Ciba-Geigy Corporation. The mixture was extruded at 260° C. using a one inch, Sterling single screw extruder.

The extrudate was then air cooled, pelletized and injection molded. The material exhibited a limiting oxygen index of 25%.

One ($\frac{1}{8}$" thick) molded sample was subjected to accelerated aging by exposure to 66° C. for 115 hours. Another ($\frac{1}{8}$" thick) molded sample, a control, was not subjected to the heat treatment. The relative level of bromine on the surface of the two samples was compared using an energy dispersive analysis of X-ray fluorescence and was found to be the same thus indicating the absence of blooming, that is, migration by the flame retarding additive to the surface of the molded composition.

EXAMPLE 4

This invention demonstrates the preparation of a molded composition comprising the flame retarding additive produced in Example 2.

About 4.4 g of the fire retarding additive described in Example 2 were melt mixed at 255° C. with 19.16 g polycarbonate (Lexan ® 101, commercially available from General Electric Company), 19.4 g DYLARK ® 700 rubber modified styrene/maleic anhydride copolymer, commercially available from ARCO Chemical Company, Division of Atlantic Richfield Company, and 0.9 g antimony trioxide using a Brabender mixing head. The resulting composition was compression molded to $\frac{1}{8}$" samples, which were tested and found to exhibit a limiting oxygen index of 26%.

One sample was subjected to accelerated aging by exposing it to 66° C. for 137 hours. Another sample, a control, was not subjected to the heat treatment. The relative level of bromine on the surface of the two samples was compared using an energy dispersive analysis of X-ray fluorescence and was found to be the same. This indicates the absence of blooming of the flame retarding additive to the surface of the molded composition.

EXAMPLE 5

This example demonstrates the preparation of a flame retarding additive of this invention.

A one-liter glass vessel equipped with a stirrer was charged with 39.3 g of N-(2,4,6 tribromophenyl)maleimide, produced using substantially the method of Example 1, 25.1 g dibromostyrene (Great Lakes Dibromostyrene), 150 g methyl ethyl ketone and 0.02 g benzoyl peroxide. The vessel was purged with nitrogen, after which it was heated to 85° C. and the polymerization was allowed to proceed for 15 hours. The polymer solution was diluted with THF, precipitated in pentane and dried under vacuum. The resulting alternating copolymer was found to have a weight average molecular weight of 302,000, as measured by GPC using polystyrene standards. It exhibited a glass transition temperature of 237° C.

EXAMPLE 6

This example demonstrates the preparation of a molded composition of this invention.

About 5.3 g of the alternating copolymer described in Example 5 were melt blended with 38.7 g polycarbonate (Lexan 101) at 255° C. using a Brabender mixing head. The resulting blend was compression molded into $\frac{1}{8}$" thick samples which were tested and found to exhibit a limiting oxygen index of 38%.

EXAMPLE 7

This example demonstrates the preparation of a molded composition of this invention.

About 5.3 g of he alternative copolymer described in Example 5 were melt blended with 37.0 g of an equimolar styrene/N-phenylmaleimide copolymer with 2.8 g of antimony trioxide at 255° C. using a Brabender mixing head. The resulting blend was compression molded into $\frac{1}{8}$" thick samples which were tested and found to exhibit a V-O flammability rating using the UL 94 test procedure.

It is evident from the foregoing that various modifications can be made to this invention. Such, however, are considered as being within the scope of this invention.

What is claimed is:

1. A moldable composition comprising a matrix resin and an alternating copolymer having the following general formula:

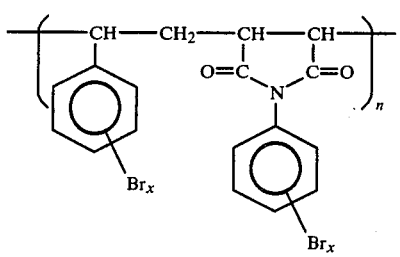

wherein each x separately represents an integer of from 1 to 5 and n represents an integer of from 10 to 2000, the alternating copolymer being present in an amount sufficient to improve the flame retarding characteristics of the matrix resin.

2. The moldable composition of claim 1 in which said matrix resin is employed in an amount within the range of from about 60 to about 95% by weight of the composition.

3. The moldable composition of claim 1 in which said alternating copolymer is employed in an amount within the range of from about 5 to about 40% by weight of the composition.

4. The moldable composition of claim 1 which said alternating copolymer is employed in an amount within the range of from about 10 to about 30% by weight of the composition.

5. A molded composition comprised of a matrix resin and an alternating copolymer having the following general formula:

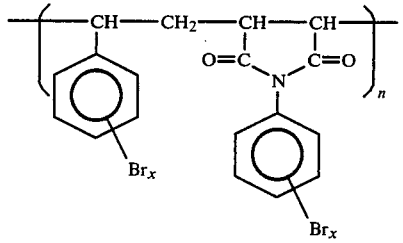

wherein each x separately represents an integer of from 1 to 5 and n represents an integer of from 10 to 2,000, produced by blending said matrix resin and said alternating copolymer and molding the resulting composition.

* * * * *